United States Patent [19]

Shimamura et al.

[11] Patent Number: 4,833,310
[45] Date of Patent: May 23, 1989

[54] DEVICE FOR READING AND WRITING MAGNETIC AND/OR IC CARD AS EXTERNAL MEMORY

[75] Inventors: Norio Shimamura; Taiji Sudo, both of Tokyo, Japan

[73] Assignee: Tokyo Tatsuno Co., Ltd., Tokyo, Japan

[21] Appl. No.: 8,247

[22] Filed: Jan. 29, 1987

[30] Foreign Application Priority Data

Jan. 31, 1986 [JP] Japan .................................. 61-19839

[51] Int. Cl.$^4$ ............................................. G06K 7/04
[52] U.S. Cl. ................................... 235/479; 235/440; 235/492; 235/493
[58] Field of Search ............... 235/479, 475, 480, 492, 235/493, 440, 441, 449

[56] References Cited

U.S. PATENT DOCUMENTS

| | | | |
|---|---|---|---|
| 3,876,981 | 4/1975 | Welch | 235/440 X |
| 4,180,207 | 12/1979 | Lee | 235/440 X |
| 4,322,613 | 3/1982 | Oldenkamp | 235/477 X |
| 4,574,190 | 3/1986 | Nishimura | 235/436 X |
| 4,575,703 | 3/1986 | Shishido | 235/479 |
| 4,612,436 | 9/1986 | Okada | 235/449 |
| 4,724,310 | 2/1988 | Shimamura et al. | 235/483 |

Primary Examiner—Philip H. Leung
Attorney, Agent, or Firm—Sughrue, Mion, Zinn, Macpeak & Seas

[57] ABSTRACT

A device having a motor and rollers for conveying a card inserted in the slot forward so as to read a magnetic stripe of the card. A system is used for feeding a carriage between the waiting position and the reading/writing position. The carriage embraces a contact pin head, which is longitudinally movable together with the carriage and vertically movable relative thereto, so that when the card is conveyed to reach the carriage in the waiting position the feeding system is automatically driven to feed the carriage and the contact pin head to the reading/writing position where the card is brought by the conveying motor components with holding engagement with the carriage to be electrically contacted at the contact points thereof with the contact pins of the head vertically moved up. Reliable reading/writing of the magnetic card as well as the IC card can be assured.

8 Claims, 5 Drawing Sheets

DEVICE FOR READING AND WRITING MAGNETIC AND/OR IC CARD AS EXTERNAL MEMORY

BACKGROUND OF THE INVENTION

The present invention relates to a device for reading information out of a magnetic and/or IC card as external memory and writing new information in the card.

Various devices having a magnetic head for reading data stored in the magnetic stripe which is formed on a plastic substrate as identification card or credit card have been widely used. For instance U.S. Pat. No. 4,322,613 discloses, although the invention is directed not to the reader itself but to a method for inhibiting tampering with data on the magnetic stripe, that there is provided a pair of rollers between which the card is frictionally fed by driving one of them with a motor to be energized in response to a signal from the first or START sensor as to feed the card to be in the reading/writing position and driven in the opposite direction in response to a signal from the second or END sensor so as to eject the card out of the device.

Meanwhile, the so-called IC card or integrated circuit card having a semi-conductor memory embedded in the plastic substrate is going to be widely used instead of said conventional magnetic card mainly because of far more memory capacity. Such a card has a plurality of electric contact points exposed to be flush with the surface thereof to be connected with the computer for reading/writing.

Various devices having a head planted with the contact pins of the number and arrangement corresponding to those of said card contact points so as to electrically connect the card inserted therein to the computer. For instance, U.S. patent application Ser. No. 747,148 filed on June 20, 1985 now U.S. Pat. No. 4,724,310 by the same applicants as in this application, discloses such a device having the contact pin head normally held in the waiting position by spring means and pushed by the card manually inserted in the device casing against the force of said spring towards the reading/writing position. The head is adapted to vertically move up sliding along a sloped floor for attaining correct engagement.

In order to cope with the situation where magnetic cards and IC cards must be read/written, the two different devices therefor are to be equipped in every shop or office. This is unsatisfactory in view of the cost of such two devices but also of possible confusion caused by customer's erroneous insertion of the magnetic card in the IC card reader/writer or vice versa. In case where one card having the magnetic stripe for a sort of data and the IC memory for the other sort of data is used, the operation must be made two times or by means of two different devices.

SUMMARY OF THE INVENTION

It is an object of the invention, thus, to provide a device capable of reliably reading and writing either of a magnetic card and an IC card as well as a card having both the magnetic stripe and the semiconductor memory as external memory.

It is a further object to provide such device adapted to automatically convey the card which is manually inserted in a slot formed at one end of the device casing to move longitudinaly therein forward for reading/writing, and automatically convey the card rearward, when reading/writing is over, to be in the initial position so as to be manually taken out of the slot.

Said object can be attained by providing such device having means for conveying the card inserted in the slot forward so as to read the magnetic stripe of the card and means for feeding a carriage between the waiting position and the reading/writing position, said carriage embracing a contact pin head, which is longitudinally movable together with said carriage and vertically movable relative thereto, so that when said card is conveyed to reach the carriage in the waiting position said feeding means is automatically driven to feed the carriage and the contact pin head to the reading/writing position where the card is brought by said conveying means with holding engagement with the carriage to be electrically contacted at the contact points thereof with the contact pins of the head vertically moved up, whereby reliable reading/writing of the magnetic card as well as the IC card can be assured.

DESCRIPTION OF THE PREFERRED EMBODIMENT

Figure 6A:
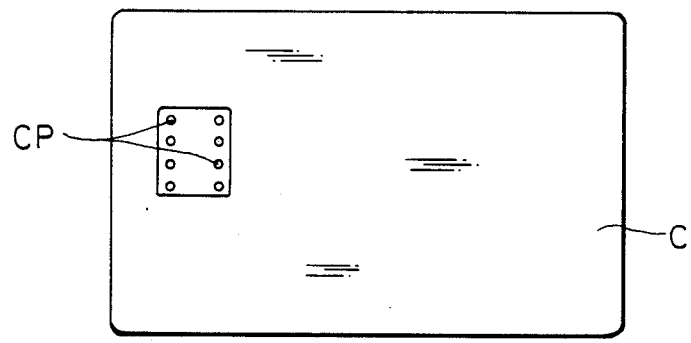
FIGS. 6A and 6B are plan views respectively of a typical magnetic card and IC card.
Figure 6B:
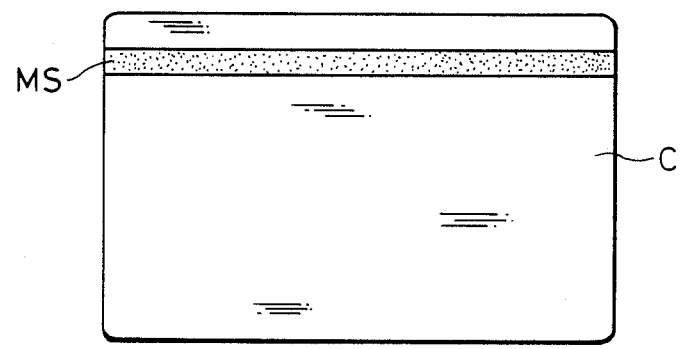

In FIGS. 6A and 6B, there are shown a typical IC card and a typical magnetic card. The former has eight contact points CP so as to be electrically connected with the contact pins of the corresponding number and arrangement and planted in the block head to be movably amounted in the device. The latter has an magnetic stripe MS to be scanned by a magnetic head mounted in the device casing to read information stored in said stripe until the contact points of the card are connected with said contact pins.

In FIGS. 1, 2A, 2B and 3, the device of the invention has a casing represented generally by 10, which has a slot 11 formed at one end wall thereof for inserting the card therethrough and a pair of longitudinal guide walls 12, 12 of the distance therebetween a little larger than the width of the card C to be guided thereby.

There are arranged in the casing 10 two pairs of rollers 13, 13' and 14, 14' to be driven by a reversible motor 15 through gearings so that when the card C is manually inserted in slot 11 the first pair of rollers 13, 13' frictionally engage with the card at the leading edge thereof so as to feed the card towards the opposite end wall of the casing. When the leading edge of the card reaches the second pair of rollers 14, 14' arranged with a distance a little shorter than the card length from said first rollers 13, 13' to take over the card feeding from the first rollers.

Figure 1:
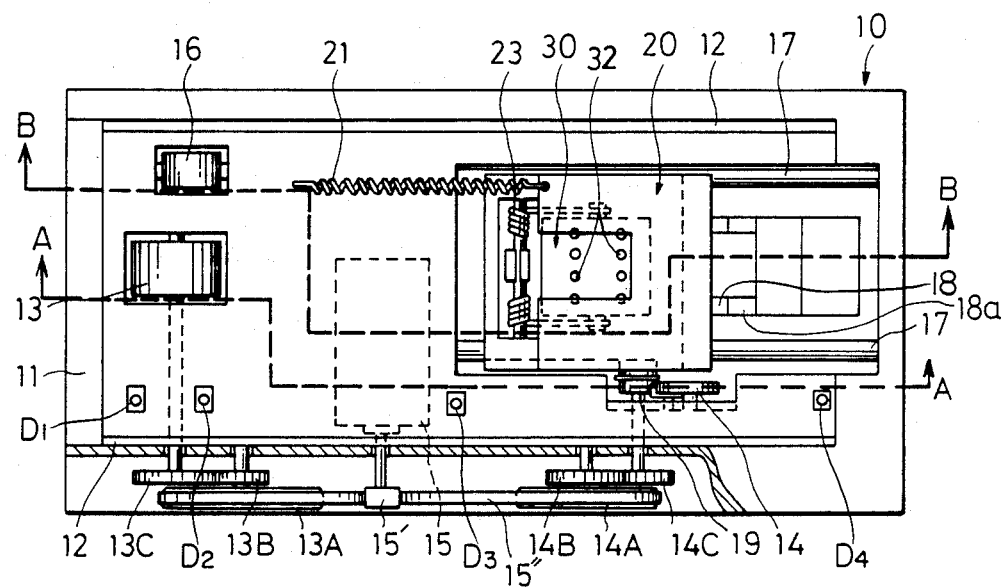
FIG. 1 is a plan view of the device according to the invention partly in section, with removing the lid.
Figure 4:
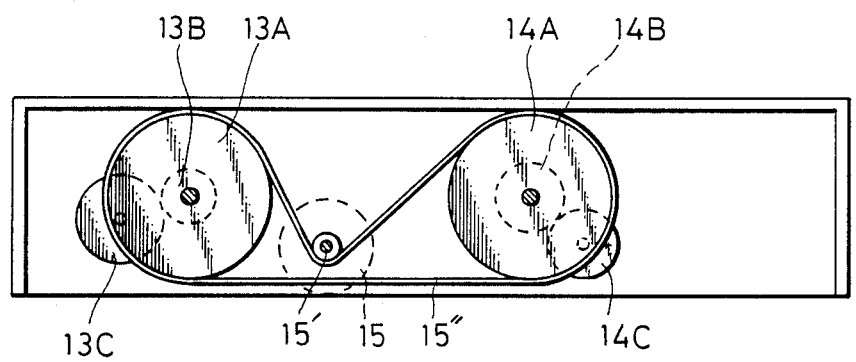
FIG. 4 is an elevation of the device at one side of the casing where gearings are arranged.

In reference above all to FIGS. 1 and 4, a pinion 15' mounted on the output shaft of the motor 15 drives gear wheels 13A and 14A through an endless internally toothed belt 15". The gear wheels 13A and 14A have respectively gear wheels 13B and 14B coaxially mounted therewith and mesh with gear wheels 13C and 14C, the former of which is coaxially mounted with the feed roller 13.

Now in reference above all to FIGS. 1, 2A, 2B and 3, there is provided a magnetic head 16 in the casing at the vicinity of the slot 11, opposite to said head being arranged an idle roller 16' urged by spring means toward the head so that the magnetic stripe MS on the card C may be scanned by head 16 for reading of the data stored therein.

Referring particularly to FIG. 1, there are provided a pair of rails 17, 17 to guide a carriage represented generally by 20, which embraces a contact head block represented generally by 30, like as in U.S. Pat. No. 4,724,310. The carriage 20 is normally held by a coiled spring 21 in the waiting position by abutting on a stopper 18b formed in the casing shown in FIGS. 1 and 2B, from which said carriage 20 is longitudinally moved along the guide rails 17, 17 to the reading/writing position shown in FIG. 3, accompanying the contact head block 30 together therewith.

Figure 2A:
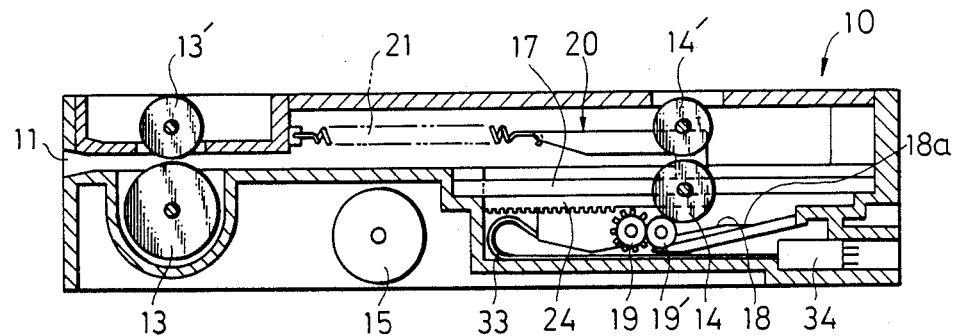
FIG. 2A is a sectional view taken along a line A—A in FIG. 1.
Figure 2B:
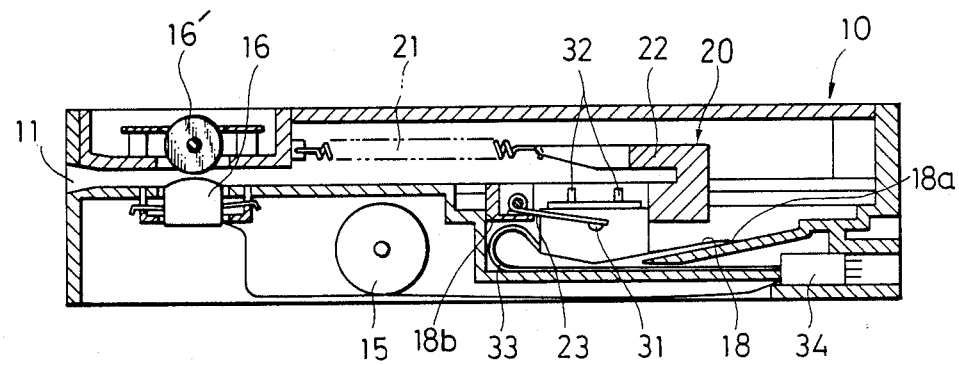
FIG. 2B is also a sectional view but taken along a line B—B in FIG. 1.

The carriage 20 is in the form of a rectangular frame having no top wall nor bottom wall so as to snugly embrace said block 30 which may vertically move relative thereto. As best shown in FIG. 2B, the carriage 20 has a flange 22 formed at the front end so that the leading edge of the card C may engage therewith (see also FIG. 3). In this connection it is noted that the distance between the flange 22 and the magnetic head 16 should be made a little longer than the effective length of the magnetic stripe MS but shorter the length of the card C so that when the card engages with the carriage 20 the reading of data stored in the stripe has been over in order to avoid reading error to be eventually caused by the spead change due to said engagement. The carriage 20 has a pair of coiled springs 23, 23 mounted at the rear end thereof so that opposite extended portions thereof may respectively engage with side protrusions 31 of the block 30 for urging the same downwards.

Figure 3:
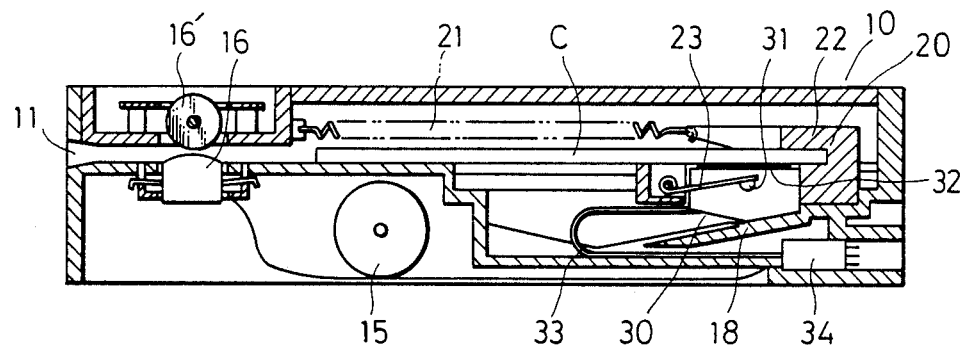
FIG. 3 is a sectional view similar to FIG. 2B but in the state where the contact pin head is in the reading/writing position for the IC card in contrast to that said head is in the normally waiting position in FIG. 2B.

The contact head block 30 has a plurality of contact pins 32 (eight in this embodiment) planted yieldingly in the upper surface thereof and the bottom thereof stably rests on the casing floor by means of a spring 23 as best shown in FIG. 2B in the waiting position. Owing to a sloped floor 18, during the carriage 20 and consequently the block 30 is brought to the reading/writing position of FIG. 3, the block is gradually raised so that the contact pins 32 may electrically connected with the contact points CP of the card C brought to be in the reading/writing position (FIG. 3). It is preferable to form a flat portion 18a adjacent to the end of said sloped floor 18 so that even if the carriage and consequently the block 30 is stopped a little earlier the block may surely rest on said flat portion 18a to keep said connection stable.

The block 30 further comprises a flexible flat web 33 made of a synthetic resin in which eight lead wires are embedded of which one ends are electrically connected with the contact pins 32 while the other ends are connected to a socket 34 to which the plug connected with the computer not shown may be fixed.

The carriage 20 further comprises a toothed rack 24 at a side wall thereof so as normally not to mesh with a pinion 19 which is mounted coaxially with the gear wheel 14C for the transmitting driving force to the feed rollers via an idle wheel 19'. The rack will mesh therewith when said carriage is pushed a little towards the right in the concerned drawings by engagement thereof at the flange 22 with the card C which is fed towards the right by means of the feed rollers 14, 14'.

Different from the device disclosed in said U.S. Pat. No. 4,724,310 in which the carriage is brought to the reading/writing position by manually pushing the card against the force of spring. The carriage 20 of the device according to this invention is brought to said position by means of the pinion 19 which is driven by the motor 15 through gearings referred to above. The rate of feeding of the carriage 20 by means of meshing of the pinion 19 with the toothed rack 24 is preferably made slower than that of feeding of the card by means of the second rollers 14, 14' so that the card C may stably keep the engagement with the carriage 20 at the flange 22 thereof.

Along the longitudinal passage for the carriage 20, there are arranged four detectors D1, D2, D3 and D4, each of which may consist of a light emitter and a light receiver, adapted to detect the position of the card and generate the corresponding signal. The detector D1 is located slightly in from the slot 11 from the first roller 13 so as to detect the card just inserted in said slot and generate the signal in reply to which the motor 15 is energized to rotate in the regular direction by means of a control circuitry to be explained later in reference to FIG. 5 and drive said roller for feeding the card C toward the carriage 20 in the waiting position. The second detector D2 is located a little to said carriage 20 from the feeding roller 13, the third detector D3 is located apart from the first detector D1 by a distance a little shorter than the card length, and the fourth D4 is located in the vicinity of the opposite end wall of the casing so as to detect the leading edge of the card C to be in the reading/writing position, respectively for the purposes to be explained later in more detail.

Figure 5:
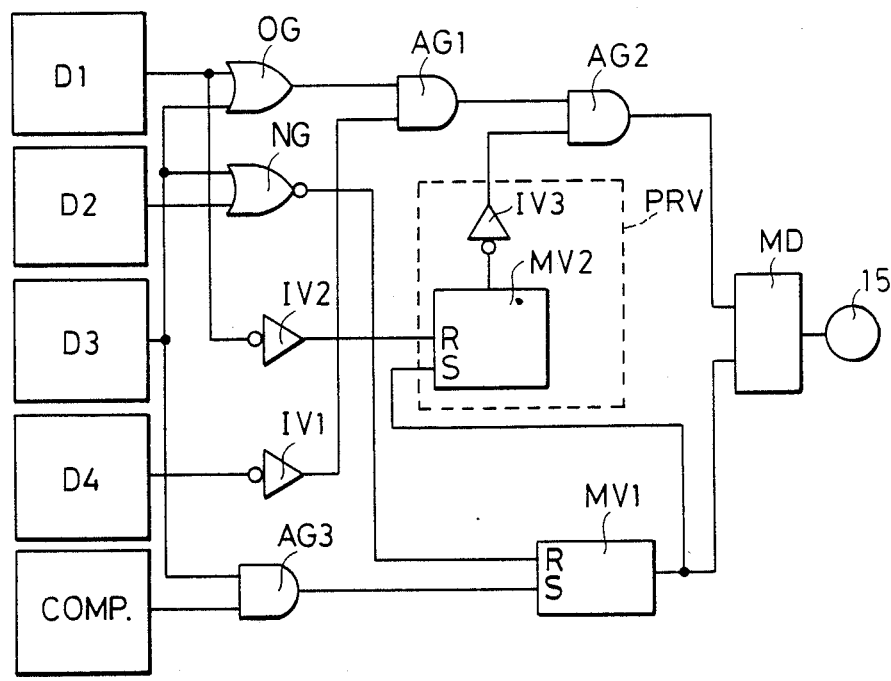
FIG. 5 is a block diagram showing means for controlling the movable members of the device.

Referring now to FIG. 5, the outputs of the detectors D1 and D3 are respectively connected to the inputs of an "OR" gate OG of which output is connected to an "AND" gate AG1, the outer input of which is connected to the detector D4 through an inverter IV1. The output of AG1 is connected to one of the inputs of a second "AND" gate AG2 to apply a regular revolution signal to a motor driving circuit MD. To another input of AG2 connected is a circuit for preventing reverse revolution PRV.

A "NOR" gate NG is connected respectively to the detectors D2 and D3 with its output connected to a reset terminal R of a multivibrator MV1 the set terminal S of MV1 is connected to an "AND" gate AG3 receiving a card release signal from the detector D3 and the host computer COMP so as to apply a reverse revolution signal to motor driving circuit MD.

The reverse revolution preventing circuit PRV comprises another multivibrator MV2 of which set terminal S receives the reverse revolution signal while the other terminal R receives the signal from the first detector D1 through another inverter IV2 and a third inverter IV3 connected to the output of the multivibrator MV2 so as to turn the "AND" gate AG2 off.

Now in operation, when the card C is manually inserted with the front side having the magnetic stripe and/or the contact points down so that the leading edge thereof reaches the first rollers 13 (13'), the high level signal from the detector D1 is put in the motor driving circuit MD through the "OR" gate OG, "AND" gate AG1 receiving the high level signal from the detector D4 via the inverter IV1 and "AND" gate AG2 receiving the high level signal from the inverter IV3 in the circuit PRV for the motor 15 to revolve in the regular direction which is transmitted through the gearings 15', 13A, 13B and 13C inclusive of the belt 15" explained above to said roller 13 (13') so that the card is then automatically fed toward the carriage 20. Said driving force is transmitted also to the second roller 14 through the gears 15', 14A, 14B, 14C, the pinion 19 and the idle wheel 19' inclusive of the belt 15", so as to feed the card during which data stored in the magnetic stripe MS is read by the head 16. The card C is further fed by the second roller 14 (14') at a constant rate, during which the trailing edge of the card has passed the first detector D1, but the "OR" gate OG receives the high level signal then from the third detector D3 to keep the motor 15 revolving in the regular direction.

After reading of the magnetic stripe is complete and when the leading edge of the card abuts on the flange 22 of the carriage and push it forward a little against the force of the coiled spring 21, the toothed rack 24 meshes with the pinion 19 so that the carriage 20 is further fed toward the reading/writing position by the motor 15 through the gearings inclusive of the pinion during which the card still fed by the second rollers 14 (14') still abuts on the flange 22 of the carriage being pushed forward as referred to above, During this the contact head block 30 slides on the sloped floor 18 to move upward relative to the carriage 20 and reset on the flat floor portion 18a so that when the card reaches the reading/writing position the contact pins 32 may respectively counterpart contact points CP of the card. Concurrently the detector D4 generates a high level signal, the output of the inverter IV1 is made a low level, and the output of the "AND" gate AG1 is made zero to stop the motor 15 so as to carry out reading/writing.

When the reading/writing operation is over, the "AND" gate AG3 having received the card release signal from the host computor COMP, generates a high level signal which actuates the multivibrator MV1 so as to rotate the motor 15 in the reverse direction. Thereby the card is frictionally moved toward the slot 11 by means of the feed roller 14 together with the carriage 20 which is moved toward the waiting position by means of the rack 24 meshing with the pinion 19 as well as the force of the spring 21 during which the leading edge of the card which might be called the trailing edge now moving backward has departed from the detector D4. The "AND" gate AG1 receives the high level signal from the third detector D3 and the inverter IV1 to generate the signal as referred to above, but this time the multivibrator MV2 generates the high level signal in reply to the set signal from the multivibrator MV1 and the inverter IV1 generates the low level signal. And thus the high level signal is not applied by the circuit PRV for preventing reverse revolution to the outer input terminal of the "AND" gate AG2 so that the signal for rotating the motor in the regular direction does not put out from said gate.

When the card is fed backward by the reversely rotating roller 14, the left edge (in the concerned drawings) arrives at the first feed roller 13 to be gripped thereby for keeping the backward movement and departs from the engagement with the carriage which is put in the waiting position by the force of the spring 21 after disengagement of the toothed rack 24 with the pinion 19.

When the card C is further moved backward so as to pass through the third detector D3 and further the second detector D2, the detectors generate a low level signal and the "NOR" gate NG generates the high level signal to reset the multivibrator MV1 for deenergizing the motor 15. The card C is held between the first feed roller 13 and the opposite guide roller 13' at the right edge so that the card partly protrudes out of the casing.

In case where the card C is not the magnetic card or a card has the magnetic stripe MS in addition to the contact points CP for the semiconductor memory, the stripe MS passes between the magnetic head 16 and the opposite guide roller 16' yieldingly urged thereto and scanned thereby for reading, which may be finished before the card abuts on the flange 22 at the leading edge. Thus reading may be made while the card is stably moved at a uniform rate in view of the arrangement referred to above.

Immediately after the reading is finished, the multivibrator MV1 actuates the driving circuit MD for energizing the motor 15 to revolve in the reverse direction, in response to the card release signal from the host computer COMP and the high level signal from the detector D3. The remainder operation is just same with the above explanation made on the IC card.

What is claimed is:

1. A device for reading and writing data stored in a magnetic and/or IC card as an external memory, comprising;
    a substantially hexahedral casing which is formed with a slot in one wall thereof for manually inserting the card therethrough, means for conveying the partly inserted card forward to a position for reading/writing and rearward to the initial position to be manually removed,
    a magnetic head arranged in the vicinity of the slot to contact with magnetic stripe formed on the card,
    an electric contact head block adapted to contact with contact point arranged on the card conveyed to be in said reading/writing position,
    a carriage for embracing the contact head block and movable between a waiting position and the reading/writing position during which the contact head block is brought from a non-operation position to an operation position wherein contact pins of the contact head block are electrically contacted with the contact points of the card, and moved out of contact,
    said carriage being provided with a rack at a side surface thereof, and
    a pinion mounted in the casing to be driven for rotation and coming on meshing with the rack when the carriage is pushed forward by the card after the magnetic stripe of the card has been scanned by the magnetic head to convey the carriage to the reading/writing position together with the contact head block.

2. The device as set forth in claim 1, in which the movement rate of the carriage moved by meshing of the rack thereof with the pinion is made slower than the feeding speed for the card by the conveying means.

3. The device as set forth in claim 1, further comprising a sloped floor formed on the bottom wall of the casing, the sloped floor, during the movement of the contact head block from the non-operating position to the operation position, gradually raising the contact head block relative to the carriage to bring the contact pins of the contact head block to contact with the contact pints of the card at the uppermost position.

4. The device as set forth in claim 3, wherein said casing comprises a horizontally flat portion at the end of the upwardly sloped floor so that the contact head block may stably rest thereon in the reading/writing position.

5. The device as set forth in claim 1, in which the carriage is correctly held in the waiting position by abutting on a stopper to which the carriage is normally urged by spring means.

6. The device as set forth in claim 1, in which the conveying means comprises a pair of rollers to be rotatingly driven by a reversible motor via transmission gearings, one of the rollers being arranged in the vicinity of the slot while the other is arranged apart with a distance therebetween a little shorter than the length of the card so as to deliver the card from one roller to the other in the way of conveying so as to convey the card with frictional contact forward and rearward.

7. The device as set forth in claim 6, in which the reversible motor drives also the pinion.

8. The device as set forth in claim 6, further comprising four sensors along the passage on which the card is conveyed, a first sensor located in the vicinity of the slot and upstream a little from the first roller to detect the leading edge of the card manually inserted for energizing the motor to revolve in the regular direction and rotate the rollers to convey the card forward, a second sensor located at a portion downstream from said first roller so as to detect the card edge being conveyed rearward for deenergizing the motor as a result of which the card is gripped by the first pair of rollers to be partly protruded out of the casing slot, a third sensor located at a center of the card conveying passage so as to detect the trailing edge of the card located in the reading/writing position for energizing the motor to revolve in the reverse direction in reply to the additional signal generated when the reading/writing is over, and a fourth sensor located in the vicinity of the casing opposite end wall so as to detect the leading edge of the card brought to the reading/writing position for deenergizing the motor to stop.

* * * * *